United States Patent [19]

Baranski

[11] Patent Number: 4,918,550

[45] Date of Patent: Apr. 17, 1990

[54] MIS-INSERTION APPARATUS FOR A TAPE TRANSPORT CAPABLE OF RECEIVING CASSETTES OF VARYING SIZES FOR PLAY

[75] Inventor: Antoni S. Baranski, San Carlos, Calif.

[73] Assignee: Ampex Corporation, Redwood City, Calif.

[21] Appl. No.: 350,080

[22] Filed: May 10, 1989

Related U.S. Application Data

[62] Division of Ser. No. 117,771, Nov. 5, 1987, Pat. No. 4,853,805.

[51] Int. Cl.⁴ ............................................. G11B 15/675
[52] U.S. Cl. ......................................................... 360/94
[58] Field of Search ..................... 360/94, 96.5, 96.6

[56] References Cited

U.S. PATENT DOCUMENTS 4,791,510 12/1988 Rademacher ........................ 360/94
4,803,575 2/1989 Nishimura et al. .................. 360/94

Primary Examiner—Robert S. Tupper
Attorney, Agent, or Firm—Harry G. Thibault; Richard P. Lange

[57] ABSTRACT

A tape transport capable of receiving cassettes of varying sizes, one at the time for play, includes a cassette indexing mechanism capable of selectively positioning the spindles which engage the reels of an associated cassette at a selected distance corresponding to the reel-center-to-reel-center distance of the cassette. Mis-insertion apparatus associated with the transport provides that any cassette smaller than the cassette receiving opening in the transport will be protected against being improperly inserted into the transport.

5 Claims, 4 Drawing Sheets

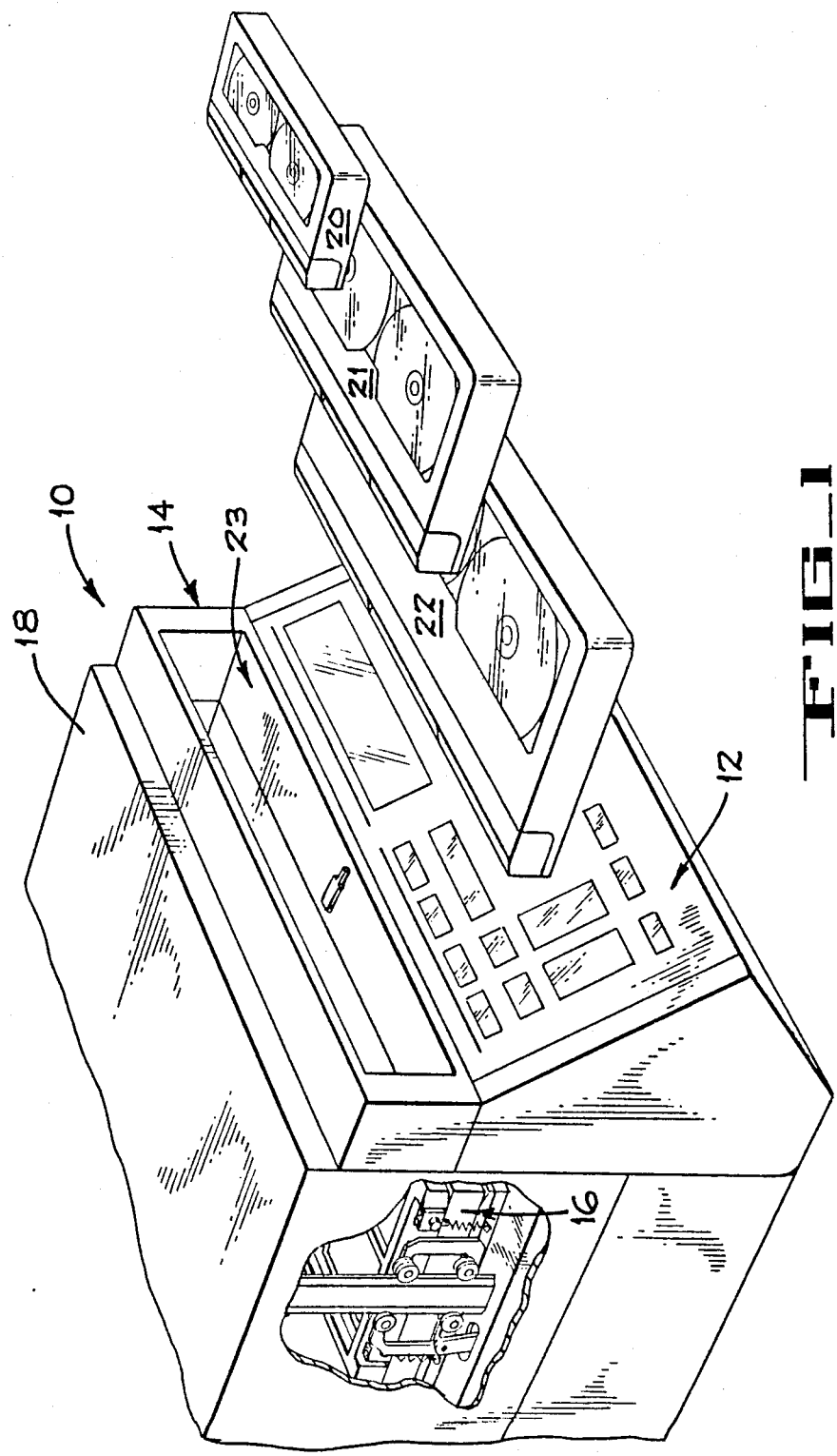
FIG_1

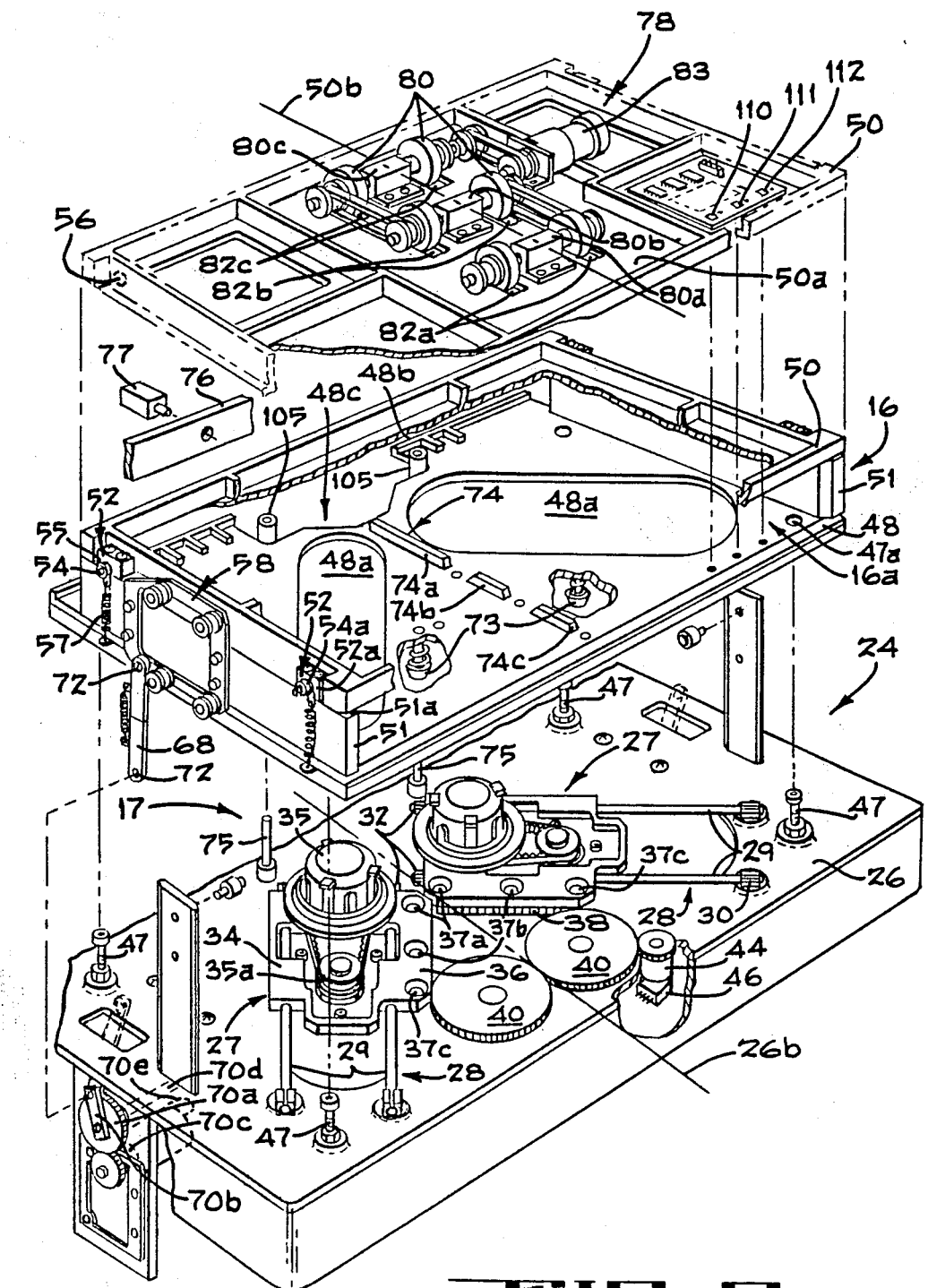
FIG_2

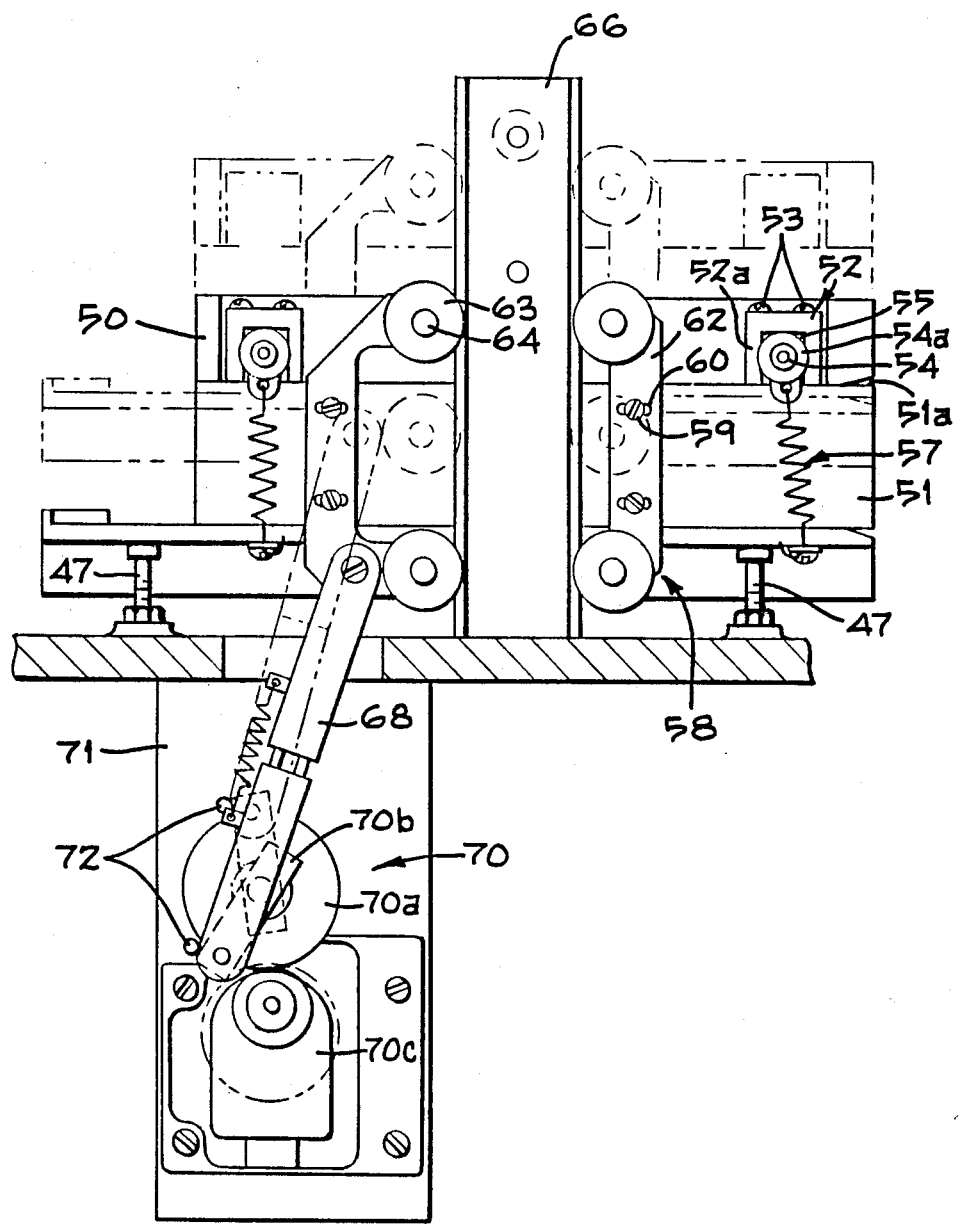
FIG_3

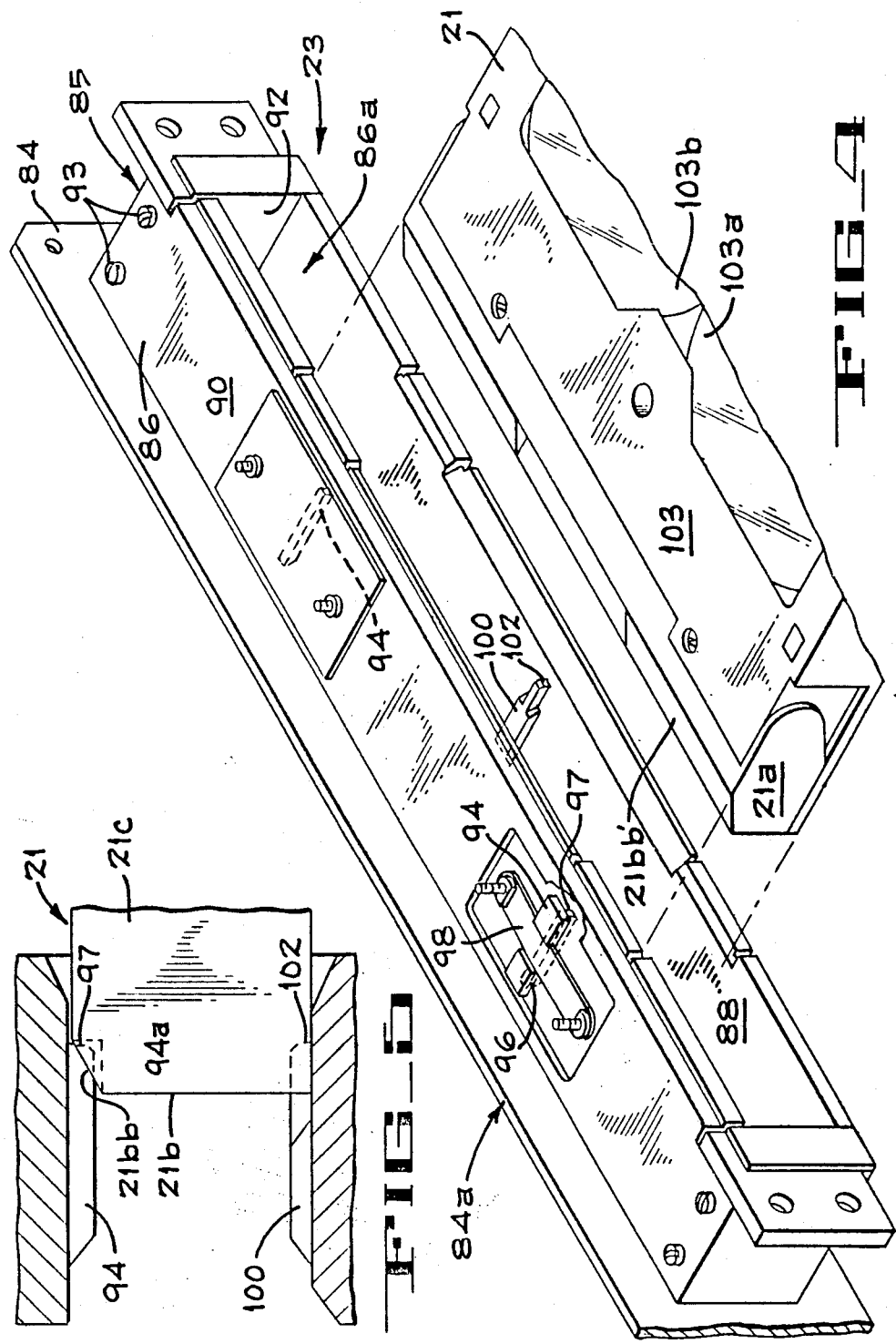

MIS-INSERTION APPARATUS FOR A TAPE TRANSPORT CAPABLE OF RECEIVING CASSETTES OF VARYING SIZES FOR PLAY

This is a divisional of co-pending application Ser. No. 07/117,771 filed on Nov. 5, 1987 now U.S. Pat. No. 4,853,805.

The present invention relates to a cassette holding apparatus for a magnetic tape transport, said apparatus capable of receiving cassettes of varying sizes, one at a time, for play. More particularly, the present invention relates to a cassette indexing mechanism associated with the cassette holding apparatus of the tape transport.

As video cassette recorders become more sophisticated, the demands of the video industry become more complex. The industry is demanding that a single machine be able to receive and play more than one size cassette. More precisely, the demand is that a single machine not only be able to play a relatively small cassette providing 30 minutes or less of tape for play, but rather a range of cassette sizes and play times, up to a large cassette providing 220 or more minutes of play time for broadcast quality tape.

It is relatively simple to design a machine which can accept two sizes of cassettes. The spindles which receive the reels of such cassettes can simply be mounted for movement on a cassette support assembly to move via a motor drive mechanism from a first end stop defining a first position for receiving the reels of a small cassette to a second end stop defining a second position at which the spindles can receive the reels of a larger cassette.

The problem becomes much more complex when a structure which can receive more than two different sizes of cassettes for play is required. The positioning of the spindles for receiving a cassette of intermediate size poses problems which have not been fully answered to date. Simply relying on the mechanism which drives the cassette support assemblies and their associated spindles from one end to the other of a translatory motion which encompasses all sizes of cassettes is not sufficient. If the user relies simply on the motor drive to maintain the spindle position during play, such reliance is not well placed because the forces applied to the tape and the cassette during play by the transport can easily override a stop position maintained solely by the motor drive, even when the end stops are an operative positioning element. That is, at one end of travel, tape drive forces oppose the motor drive forces at the end stop.

Accordingly the present invention provides a cassette indexing mechanism for a magnetic tape transport which positively positions and fixedly aligns the cassette support assemblies and their associated spindles for engagement with each size cassette of a series of three or more cassettes. Such mechanism includes apparatus for positively positioning the associated spindles and then holding that position. The cassette elevator engaging the turntable support assembly of the present invention includes positive leveling and aligning structure to assure that the elevator is properly positioned for moving each size cassette into engagement with the turntable support assembly for play by the transport. The elevator of the present invention also includes a positive feed roller assembly for engaging and driving the cassette to a position for play by the transport, said assembly driveable in a reverse direction to eject the cassette from the transport.

The transport of the present invention also includes positive mis-insertion apparatus at the entrance of the elevator to prevent each of the smaller cassettes of the series of cassettes useable in the transport from being inserted into the elevator in a position which would prevent them from being played by the transport. In addition, the elevator of the present invention includes a positive control mechanism associated with the drive motor of the elevator to position, retain and bias a cassette held within a cassette holding apparatus of the elevator to a position for play by the transport.

Accordingly the present invention provides a record-/reproduce magnetic tape transport for receiving magnetic tape cassettes of varying sizes, one at a time for play. In the present invention the transport includes an elevator for receiving cassettes, the elevator capable of receiving cassettes of varying sizes and including mis-insertion apparatus provided on the transport to assure that a cassette cannot be inserted into the elevator except in a position which will enable the elevator to receive and load the cassette and deliver it to a position for play in the transport.

The base plate of the elevator is aligned with a tape drive assembly at the front face of the elevator and leveled to enable such elevator to descend to a play position of the transport. The top plate of the elevator includes a feed roller assembly for driving the cassettes into engagement with a stop member of the transport to initiate a play cycle for the transport and, when oppositely driven, for ejecting the cassette from the transport. The top plate and the bottom plate of the elevator are biased toward each other to bring the feed roller assembly into driving relation with the cassette inserted into the elevator. A rotary motor driven by an optical encoder and associated with the elevator drives the elevator from a cassette load position to a play position in the transport.

A cassette indexing mechanism includes a pair of aligned indexing members, provided on the underside of the base plate of the elevator, such indexing members engageable with corresponding indexing holes provided on respective turntable support assemblies which support each of the rotating spindles of the transport. Each spindle is mounted on its respective turntable support member, such member being translatable along a rail set to specific positions corresponding to receiving positions of the spindles for cassettes of varying sizes. At a first position, a first pair of indexing holes is aligned with the indexing members on the underside of the base plate of the elevator, the members driven into a set of holes to fix the position of the turntables and the spindles thereon to correspond to a reel-center-to-reel-center distance for a first size cassette. Each successive set of indexing holes corresponds to a successive such distance for each succeeding larger size of cassette.

Having briefly described a preferred embodiment of the present invention and the advantages associated therewith it is believed that the reader can better understand the present invention and will be better able to determine additional advantages associated therewith in a detailed description of such invention, particularly when such description is considered with the accompanying drawings.

BRIEF DESCRIPTION OF THE DRAWINGS

FIG. 1 is a perspective view of a magnetic tape transport incorporating the multi-size cassette indexing mechanism of the present invention, with portions thereof removed for clarity;

FIG. 2 is an exploded perspective view of a cassette elevator overlying a turntable support assembly of the tape transport, with portions of both the elevator and the turntable support assembly removed for clarity, and including a perspective view of the top plate to provide additional information;

FIG. 3 is a partial side elevation of the elevator of FIG. 2, including the drive motor therefor;

FIG. 4 is a detailed perspective view of the mis-insertion shown in FIG. 1, with portions thereof removed for clarity; and FIG. 5 is a side elevation of FIG. 4, partially in section and with a cassette being inserted therein.

DETAILED DESCRIPTION

As shown in FIGS. 1 to 3, a magnetic tape transport 10 includes a control panel 12, a cassette loading port 14, a cassette elevator 16, and a tape drive assembly (not shown). A cover plate 18 overlies the elevator 16 and the transport 10 is mounted slidably on rack mount rails (not shown) to provide ready access to the interior of the transport 10 for removal and repair.

The loading port 14 is designed to receive, one at a time, cassettes 20, 21, or 22. The cassettes 20-22 are of varying sizes and can provide from 30 minutes of recording time or less on the smallest cassette up to 220 minutes or more on the largest cassette 22. The loading port 14 cooperates with each of the cassettes 20-22 to assure that each size cassette 20-22 is properly inserted into the loading port 14 for play but also to prevent mis-insertion of each of the cassettes 20, 21 or 22; that is, mis-insertion apparatus 23 associated with the loading port 14 prevents the cassettes 20, 21 or 22 from being mis-inserted into the loading port 14, such as backwards, sideways, etc. For exemplary purposes, and for simplicity, only the mid-sized cassette 21 is used in the discussion below, it being understood that either of the cassettes 20 or 22 could be readily substituted therefor.

The present invention also encompasses the elevator 16 associated with the tape transport 10 and a turntable support assembly 24 underlying the elevator 16. The turntable support assembly 24 comprises a base plate 26 of the transport 10, having mounted thereon a pair of turntable assemblies 27, each mounted for slidable movement on respective guide rail sets 28. Each guide rail set 28 includes a pair of guide rails 29 mounted in generally parallel, spaced relation, with each rail 29 having at a first end, a first end stop 30, and at an opposite end, a second end stop 32. The guide rail sets 28 are angularly mounted on the base plate 26 to extend toward the front of the base plate 26 and to be symmetrically positioned about a front to rear centerline 26a of the base plate 26. Each turntable assembly 27 comprises a support body 34 receiving a rotatable spindle 35 driven by its associated drive mechanism 35a. An inner extension 36 of each turntable body 34 includes a series of indexing holes 37a, 37b and 37c which will be described in more detail below.

Each inner face 38 of each extension 36 is grooved to engage one of a pair of intermeshed drive gears 40, each gear 40 mounted to drive a respective turntable assembly 27 along its guide rail set 28 from each set of first end stops 30 to each set of opposite end stops 32, and back. An associated gear drive motor 44 drives one of the gears 40 and its intermeshed twin gear 40 to synchronously move the turntable assemblies 27 along respective guide rail sets 28. A position encoder 46 is provided on the gear drive motor 44 to precisely rotate and position the gear drive motor 44, and in turn to precisely position the turntable assemblies 27 at designated complementary positions along each respective guide rail set 28. Near the four corners of the base plate 26 are provided leveling screws 47 which engage the elevator 16 to support and level it when it is lowered to the play position of the transport 10.

Overlying the base plate 26 and the associated turntable assemblies 27 is the cassette elevator 16. Elevator 16 comprises a bottom plate 48 and a top plate 50. As seen in FIGS. 2 and 3, the bottom plate 48 and the top plate 50 are separated by spacers 51 located at opposite ends of the elevator 16. The bottom plate 48 and spacers 51 are appropriately secured in fixed, assembled relation.

At the top of each spacer 51, at opposite ends thereof, a pair of U-shaped members 52 having downwardly extending arms 52a are mounted so as to close the open ends of the members 52 against the spacer 51. Fasteners 53 are inserted through suitable openings in arms 52a to engage complementary threaded openings in the top wall 51a of the spacer 51 to secure the members 52 to each spacer 51 to define an opening 55 between each member 52 and the spacer 51. A roll pin 54 is inserted into each opening 55 to engage a complementary opening 56 in the top plate 50 and be secured in place by fasteners 54a. A spring assembly 57 is connected at one end to each roll pin 54 and, at an opposite end, to bottom plate 48, each spring assembly 57 disposed outside each spacer 51 to bias the top plate 50 toward the base plate 48 for spring-held engagement therewith.

Mounted at the side of the elevator 16 and fastened to each of the spacers 51 is an elevator guide assembly 58 Fasteners 59 pass through oblate openings 60 provided in an elevator guide plate 62 to be threaded into complementary openings in each spacer 51 to bring the inside of each guide plate 62 into engagement with its associated spacer 51. Two pairs of guide wheels 63 are disposed opposite each other in spaced relation, each wheel 63 rotatably mounted on the outside of the guide plate 62 as by a fastener 64, the pairs of guide wheels 63 so mounted as to engage opposite edges of an elongate elevator guide post 66 provided on opposite sides of the transport 10, each post 66 appropriately mounted on the turntable support assembly 24 of the transport 10. A spring loaded drive member 68 extends between each elevator guide assembly 58 and a drive motor assembly 70 comprising a rotary gear 70a, a fixed linkage 70b mounted on the gear 70a, a drive motor 70c driving the gear 70a and a coupling member 70d interconnecting the two drive members 68. A vertical mounting bracket 71 supports the assembly 70, with the gears 70a so mounted thereon that upper and lower over center pins 72, also mounted on the bracket 71, engage the member 68 at opposite limits of travel, at an over center position with respect the coupler 70d, to restrain the drive assembly 70 at the respective above-described limits. A position encoder 70e provides servoed position information to drive the motor 70c between a first upper, cassette insert position and a second lower, cassette play position for the elevator 16. The drive member 68 converts the rotary motion of the drive motor assembly 70 into a translatory motion which drives the elevator 16 up and down. Fasteners 72 provided at opposite ends of the drive member 68 connect the member 68 to the elevator guide assembly 58 at one end and to the coupler 70d at an opposite end.

As best seen in FIG. 2, the bottom plate 48 of the elevator 16 includes a pair of cut outs 48a, each of which generally overlies a respective turntable assembly 27. The rear edge 48b of the plate 48 includes a cut out 48c which lies adjacent a pair of tape guide pins 75 mounted on the base plate 26. On the underside of the bottom plate 48 are provided a pair of indexing members 73 solidly joined thereto and at a fixed distance apart. The indexing members 73 are complementary to and engageable with one of the pairs of complementary indexing holes 37a, 37b, 37c provided on respective turntable assemblies 27 mounted on the base plate 26. On the top side of the bottom plate 48 is provided a center guide vane 74 for guiding a cassette 21 into the elevator 16, the vane 74 broken up into a solid segment 74a at the rear of the bottom plate 48 and two movable vane sections 74b and 74c provided at respective mid and front portions of the top plate 48. Mounted at the rear of the cassette receiving compartment of the elevator 16, on a rear wall 76 thereof, is a cassette home position sensor or pushbutton 77, to be engaged by the cassette 21 as it is driven into the elevator 16 to the home position.

Operating to drive the cassette 21 into the elevator 16 is a feed roller assembly 78 mounted on the top surface of the top plate 50 of the elevator 16. The feed roller assembly 78 comprises first, second and third interconnected two-roller-sets 80a, 80b, 80c of feed rollers 80 mounted generally front to back on an upper face 50a of top wall 50, along a centerline 50b thereof. Roller sets 80a, b, c extend downwardly through respective complementary openings 82a, 82b, 82c in the top wall 50 so that each of the sets 80a, 80b, 80c of feed rollers 80 are in engaging relationship with a cassette 21 inserted into the elevator 16. The spring assemblies 57 connecting the top plate 50 to the bottom plate 48 bias the rollers 80 of the feed roller assembly 78 toward a cassette 21 in the elevator 16. A feed roller motor 83 associated with the feed roller assembly 78 operates to drive the interconnected sets 80a, b, c to draw the cassette 21 to a home position in the elevator 16, to engage the home position sensor 77 and thereby to actuate the elevator drive motor assembly 70 to move the cassette 21 into engagement with the turntable assemblies 27 underlying the elevator 16.

Mis-insertion apparatus 23, best seen in FIGS. 4 and 5, comprises a cassette receiving port 85 including a front plate 84 disposed above the control panel 12 of the transport 10, the front plate 84 having a cassette-receiving sleeve or hood 86 mounted thereon, the sleeve 86 extending outwardly two or more inches from the face of the front plate 84. Both the sleeve 86 and the plate 84 have complementary openings 86a, 84a sufficiently large to accommodate the edgewise and lengthwise insertion of the largest cassette 22 of the cassette series 20-22, the openings 86a, 84a aligned with a complementary front opening 16b of the elevator 16. The sleeve 86 is appropriately secured to the plate 84 to fix the alignment of openings 86a, 84a.

The sleeve 86, made of a metallic or plastic material, is structured much like the elevator 16, with a bottom plate 88, a top plate 90, and spacers 92 at opposite ends of the opening 86a, and fasteners 93 joining the members 88, 90 and 92. Spaced along the top plate 90 are two spring-mounted detents 94, each disposed inwardly from an opposite edge of the top plate 90 about one-third the length of the plate 90. Each detent 94 is mounted in a complementary opening 96 in the top plate 90 so as to extend an abutment face 97 downwardly into the opening 86a. The abutment face 97 is generally perpendicular to the top plate 90 and is retained in the opening 86a by a resilient leaf spring element 98. A complementary detent 100 is mounted at mid-length of the bottom plate 88 to extend an abutment face 102 up from the bottom plate and into the opening 86a. The detent 100 is generally aligned with the vane 74 of the elevator 16 and is mounted in the bottom plate 88 similarly to the mounting of the detents 94 in the top plate 90, with a like resilient leaf spring element 98 holding the abutment face 102 in the opening 86a. Both the detents 94 and 102 are movable against the spring element 98 to move them out of the way of the cassette 21 passing into the transport 10 through the port 85.

The cassette 21 comprises a relatively shallow, rectangular box 103 holding a supply reel 103a and take-up reel 103b whereby tape moves from the supply reel 103a, around a set of tape guides 75 (FIG. 2) and across a read/write assembly of the tape transport 10 for play and then is wound onto the take-up reel 103b. A door 21a mounted in the front of the cassette 21 to protect the tape is unlatched by a member 104 on the bottom plate 48 of the elevator 16 as the cassette 21 reaches the home position, the door 21a being opened as the elevator 16 lowers the cassette 21 to the play position to enable the read/write assembly of the transport 10 to engage the tape. Each face 21b, c or d of the cassette 21 capable of being inserted into the loading port 14 of the transport 10 via the sleeve 86 is either a flat face which confronts one or more of the abutment faces 97, 102 when being inserted into the sleeve 86 to prevent the cassette 21 from being inserted into the sleeve 86 and the loading port 14 behind it, or terminates in a beveled edge at one or both ends of the face, with such beveled edge engaging and moving the detents 94, 102 out of the way. For example, a corner 94a at the front edge of the detent 94 is engaged by a beveled portion 21bb of edge 21bb at the upper front face 21b of the cassette 21 when the cassette 21 is inserted into the sleeve 86 mounted adjacent to the loading port 14 of the transport 10. Both the side faces 21c and the rear face 21d (FIG. 1) have sharp edges top and bottom so that the cassette 21 may neither be inserted at a side face 21c nor at a rear face 21d into the sleeve 86 associated with the loading port 14 of the transport 10. In addition, the non-beveled edge 21bb of cassette insert face 21b and the spacing of detents 94 prevent mis-insertion of face 21b. Further, the combination of upper detents 94 and lower detent 102 act as guides when the cassette 21 is inserted at a loading position close to the proper loading position, thereby operating to align the cassette 21 with the detent 102 and the center vane 74 cooperative therewith to assure that the cassette 21 is properly inserted into the sleeve 86 for transport to a home position for the cassette 21 in the elevator 16 of the transport 10.

OPERATION OF THE PREFERRED EMBODIMENT

The structure, function and operation of the preferred embodiment might best be understood by presenting here an exemplary operational cycle therefor.

A starting point for the operating cycle should be the set-up procedure for the elevator 16 since the end position or play position of the elevator 16 is critical to the operation of the transport 10. Leveling screws 47, provided near the four corners of the rectangular upper surface of the base plate 26, engage the bottom of bottom plate 48 of the elevator 16 and can be adjusted through complementary openings 47a in the plate 48 to level the base plate 48. Alignment caps 105 are mounted to overlie tape guide pins 75. Fasteners 59, which secure the guide plates 62 to spacers 51 through oblate openings 60 are loosened to enable the corners of the cut-out 48c to be brought into engagement with alignment caps 105, such procedure both leveling the elevator 16 and fixing its position with respect to an optimum play position of the tape drive assembly of the transport 10.

The discussion of the operating cycle also uses a medium size cassette 21. With the elevator 16 properly positioned, the transport operating cycle begins with the cassette 21 poised at the entrance to the loading port 14 just outside the sleeve 86 of the cassette receiving port 85. Detents 94 extend downwardly from the top plate 90 of the sleeve 86 and a single center detent 102 extends upwardly from the bottom plate 88 of the sleeve 83. Abutment faces 97 of the detents 94 are positioned to engage side faces 21c and rear face 21d to prevent the cassette 21 from being pushed into the loading port 14 either sidewise or backward. Poised in the proper loading position, the cassette 21 enters the cassette receiving port 85 through the sleeve 86 to pass over the front plate 84 and through the complementary opening 84a. As the cassette 21 passes through the sleeve 86 a center guide on the cassette 21 depresses the lower detent 102 and forward upper beveled edges 21bb engage sharp corners 94a of the detents 94 to enable the cassette 21 to pass through the sleeve 86 of the cassette receiving port 85 past the complementary opening 84a in front plate 84 and into the elevator 16 of the transport 10. Mounted on top plate 50 of the elevator 16 are three sensors 110, 111 and 112, aligned at a forward edge thereof, two of which (110, 111) are covered by the cassette 21 to initiate an operating sequence of the elevator 16 of the transport 10.

That operating sequence sends a signal from sensors 110, 111 to the position encoder 46 to drive the drive motor 44 and associated gears 40 to precisely position the turntable assemblies 27 at the position which will enable them to receive the reels of the cassette 21. That predetermined position also aligns indexing holes 37b at a fixed center-to-center distance identical to the fixed center-to-center distance between indexing members 73. The sensors 110, 111 also activate the feed roller motor 83 to initiate an insert cycle for the feed roller assembly 78 to drive the cassette 21 into the elevator compartment 16a of the elevator 16. Spring assemblies 57 provided at opposite sides of the elevator compartment 16a bias the feed roller assembly 78 toward the cassette 21 to assure that there is sufficient driving force between the roller sets 80a, b, c and the cassette 21 to assure that the cassette 21 will be drawn into the elevator compartment 16a of the elevator 16 and to the home position to activate the home position sensor 77. As the cassette 21 is drawn into the elevator compartment 16a by the assembly 78, a vane 104b in the bottom plate 48 and which extends generally toward the cassette 21 being inserted into the elevator compartment 16a engages a corresponding slot on the bottom face of the cassette 21 to unlatch the cassette door 21a. Similar vanes 104a and 104c are provided for engagement with similar door latches provided on the small cassette 20 and the large cassette 22.

When the cassette 21 reaches the home position in the elevator compartment 16a and the cassette door 21a is unlatched, the drive motor assembly 70, with the link 68 biased to a first over center position against the upper pin 72 when the motor 70c is shut off, is activated to drive members 68 to move the elevator 16 downwardly to open the door 21a to expose the tape and to enable the reels 103a, 103b of the cassette 21 to engage the turntable assemblies 27 of the transport 10. The rotary motion of the drive motor 70c is converted into a translatory motion which drives the elevator 16 downward by opposite spring loaded drive members 68 to a second over center position against the lower pin 72 to hold the elevator 16 in the downward position against the leveling screws 47 when the drive motor 70c shuts off at the end of its cycle.

At a play position for the cassette 21 in the transport 10, the indexing members 73 on the bottom of bottom plate 48 of the elevator 16 engage complementary holes 37b in the turntable assemblies 27, to fix and hold the spindles 35 of the turntable assemblies 27 at a center-to-center distance corresponding to the reel-center-to-reel-center distance of the cassette 21.

To eject the cassette 21 after play, the sequence is reversed to cause the drive motor assembly 70 to raise the elevator 16 to its initial position, the tractor drive wheel mechanism 78 is reversed to eject the cassette 21 first from the elevator compartment 16a through the opening 84a in the front plate 84 to thrust the rear edge of the cassette 21 outward of the sleeve 86 of the cassette receiving port 85.

Modifications and improvements to the apparatus described herein will appear to those skilled in the art. Accordingly, no limitation on the invention is intended by the description or drawings herein, except to set forth in the appended claims.

What is claimed is:

1. In a magnetic recording and reproducing apparatus capable of receiving cassettes of varying size, one at a time for play, mis-insertion apparatus preventing a cassette having a front insertion face with beveled and non-beveled edge portions and side and rear mis-insertion faces with relatively sharp edges from being mis-inserted into a cassette receiving compartment of an elevator of the apparatus, said mis-insertion apparatus comprising:

a cassette receiving sleeve extending forwardly of the elevator of the apparatus, said sleeve including a bottom plate, a top plate and connecting side plates, which define a cassette insertion opening in the cassette receiving sleeve compatible with the largest size cassette to be inserted into the sleeve;

at least one detent mounted on the cassette receiving sleeve and biased into the cassette insertion opening of the mis-insertion apparatus, said detent disposed in the path of the cassette to be inserted into the cassette insertion opening of the cassette receiving sleeve; and said detent having an abutment face extending generally perpendicularly downwardly from the top plate of the cassette receiving sleeve, said detent engageable with the respective side of the cassette to be inserted into the cassette insertion opening in the cassette receiving sleeve said detent being immovable to prevent admission of the cassette to the elevator when a face of the cassette engaging the abutment face corresponds to a mis-insertion position for the cassette, and the detent being movable against its bias into the cassette insertion opening to admit the cassette to the elevator when the beveled edge portions of the front insertion face of the cassette to be inserted into the cassette receiving sleeve are positioned to engage and move the abutment face of the detent against its bias and out of the cassette insertion opening of the cassette receiving sleeve.

2. Cassette mis-insertion apparatus as claimed in claim 1 wherein the cassette receiving sleeve includes a bottom plate and a top plate mounted in spaced relation with first and second upper detents inwardly spaced from opposite sides of the cassette receiving sleeve, first and second openings provided in the top plate to receive each detent, each detent including an abutment face facing toward the cassette insertion opening, and a resilient spring element to bias each detent to extend a respective abutment face downwardly into the cassette receiving sleeve, each abutment face terminating in a corner, each detent immovable when a cassette face engages the abutment faces in a mis-insertion position to prevent the cassette from being inserted into the cassette receiving sleeve, the detents being movable when a complementary beveled edge portion at the front insertion face of the cassette engages the respective corners of the detents to move the abutment faces out of the cassette insertion opening of the cassette receiving sleeve against the bias of the resilient spring element engaging its respective detent.

3. Cassette mis-insertion apparatus as claimed in claim 2 wherein a single detent is mounted at a mid-portion of the bottom plate of the cassette receiving sleeve, an opening in the bottom plate receives the detent, and a resilient spring element biases an abutment face of the detent upwardly into the cassette receiving sleeve thereof, the abutment face terminating in a corner, the detent immovable when a cassette face engages the abutment face in a mis-insertion position to prevent the cassette from being inserted into the cassette receiving sleeve, the detent being movable when a complementary beveled edge portion at the front insertion face of the cassette engages the corner of the detent to move the abutment face out of the cassette insertion opening of the cassette receiving sleeve against the bias of the resilient spring element engaging the detent.

4. Cassette mis-insertion apparatus as claimed in claim 3 wherein the elevator of the recording and reproducing apparatus includes a center vane for receiving cassettes of varying sizes for play, the center vane being used for cassette alignment, and the detent on the bottom plate of the cassette receiving sleeve being aligned with the center vane of the elevator to guide cassettes directed by the upper detents into the cassette receiving compartment of the elevator.

5. Cassette mis-insertion apparatus as claimed in claim 4 wherein the upper detents are so positioned in spaced relation to engage non-beveled portions of the front insertion face to be immovable when the front insertion face of the cassette is in a mis-insertion position at the cassette insertion opening of the cassette receiving sleeve.

* * * * *